(12) United States Patent
Balboni et al.

(10) Patent No.: US 10,970,091 B2
(45) Date of Patent: *Apr. 6, 2021

(54) CREATING AN ON-DEMAND SKILLS BLUEPRINT OF A MOBILE APPLICATION

(71) Applicant: International Business Machines Corporation, Armonk, NY (US)

(72) Inventors: Frederick H. Balboni, New York, NY (US); Blaine H. Dolph, Western Springs, IL (US); Raman Harishankar, Blacklick, OH (US); Susan L. Sylvia, El Dorado Hills, CA (US); Catalin Sava, Ontario (CA); Ram Viswanathan, Plano, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,566

(22) Filed: Jun. 26, 2019

(65) Prior Publication Data
US 2019/0317779 A1   Oct. 17, 2019

Related U.S. Application Data

(63) Continuation of application No. 15/256,885, filed on Sep. 6, 2016, now Pat. No. 10,379,879.

(51) Int. Cl.
*G06F 9/451* (2018.01)
*G06F 8/38* (2018.01)
(Continued)

(52) U.S. Cl.
CPC .............. *G06F 9/451* (2018.02); *G06F 8/38* (2013.01); *G06F 8/65* (2013.01); *G06F 9/44505* (2013.01);
(Continued)

(58) Field of Classification Search
CPC ........ G06F 9/451; G06F 9/443; G06F 3/0482; G06F 17/3867; G06F 17/3053;
(Continued)

(56) References Cited

U.S. PATENT DOCUMENTS

| | | | |
|---|---|---|---|
| 2014/0109046 A1* | 4/2014 | Hirsch | G06F 8/60 717/120 |
| 2017/0032050 A1* | 2/2017 | Kol | G06F 40/14 |

OTHER PUBLICATIONS

List of all IBM related dockets. Appendix P. 2019.

* cited by examiner

*Primary Examiner* — Quoc A Tran
(74) *Attorney, Agent, or Firm* — Garg Law Firm, PLLC; Rakesh Garg; James Nock

(57) ABSTRACT

A mobile app is analyzed to determine each UI configuration in a set of UI configurations that is reachable in a possible use of the mobile app. A set of elements used in the mobile app relative to a selected UI configuration from the set of UI configurations is detected. A function performed by a selected element relative to the selected UI configuration is analyzed. The function is matched with a function identified in a hierarchy of elements, the hierarchy being applicable to a plurality of mobile apps. A category of the function identified in the hierarchy is assigned to the selected element. Using the hierarchy, a type of development skill used in developing the selected element is determined. In a blueprint of the mobile app, the category, the type of the development skill, and a numerosity of occurrences of the selected element in the mobile app are output.

20 Claims, 5 Drawing Sheets

(51) Int. Cl.
*G06F 8/65* (2018.01)
*G06F 9/445* (2018.01)
*G06F 8/61* (2018.01)
*G06F 3/0482* (2013.01)
*H04L 29/08* (2006.01)
*G06F 40/166* (2020.01)
*G06F 40/30* (2020.01)
*G06F 40/284* (2020.01)
*G06F 16/33* (2019.01)
*G06F 40/186* (2020.01)
*G06F 16/951* (2019.01)
*G06Q 10/00* (2012.01)
*G06F 40/253* (2020.01)
*G06F 16/93* (2019.01)
*G06F 40/197* (2020.01)
*G06F 17/00* (2019.01)
*G06Q 10/10* (2012.01)

(52) U.S. Cl.
CPC .............. *G06F 3/0482* (2013.01); *G06F 8/61* (2013.01); *G06F 16/334* (2019.01); *G06F 16/93* (2019.01); *G06F 16/951* (2019.01); *G06F 40/166* (2020.01); *G06F 40/186* (2020.01); *G06F 40/197* (2020.01); *G06F 40/253* (2020.01); *G06F 40/284* (2020.01); *G06F 40/30* (2020.01); *G06Q 10/10* (2013.01); *H04L 67/1095* (2013.01)

(58) Field of Classification Search
CPC ..... G06F 8/61; G06F 8/65; G06F 8/39; G06F 8/38; G06F 9/44505; G06F 40/166; G06F 40/186; G06F 40/197; G06F 40/253; G06F 40/30; G06F 40/284; G06F 16/93; G06F 16/334; G06F 16/951; H04L 67/1095; G06Q 10/10
See application file for complete search history.

CREATING AN ON-DEMAND SKILLS BLUEPRINT OF A MOBILE APPLICATION

TECHNICAL FIELD

The present invention relates generally to a method, system, and computer program product for analyzing mobile applications. More particularly, the present invention relates to a method, system, and computer program product for creating an on-demand skills blueprint of a mobile application.

BACKGROUND

Wireless communications (mobile communications) enable users to perform a variety of tasks using their mobile devices. An ever increasing number of applications is available for the wireless data processing systems, wireless data communication devices, or wireless computing platforms (collectively and interchangeably, "mobile device" or "mobile devices"). For example, many mobile devices not only allow the users to make voice calls, but also exchange emails and messages, access remote data processing systems, and perform web-based interactions and transactions. Wearable devices are a category of mobile devices. A wearable device is essentially a mobile device, but has a form-factor that is suitable for wearing the device on a user's person.

Hereinafter, a mobile application is interchangeably referred to as simply "mobile app" or "app" unless expressly disambiguated where used. A mobile application is a software application that is designed and configured to operate on a mobile device.

A mobile app comprises user interface components and functional components. A user interface (UI) allows a human user to interact with the app, and a functional component performs a function or operation for which the app is configured. The functional components are subdivided according to functions performed by those components. One type of functional components are integration components, which perform functions related to integration of the mobile app with other applications and systems. Another type of functional components includes functional components which perform app-specific functions other than integration functions.

SUMMARY

The illustrative embodiments provide a method, system, and computer program product. An embodiment includes a method that performs an analysis, using a processor and a memory, of a data of a mobile app, the analysis determining each UI configuration in a set of UI configurations that is reachable in a possible use of the mobile app. The embodiment detects a set of elements used in the mobile app relative to a selected UI configuration from the set of UI configurations. The embodiment analyzes, using the processor and the memory, a function performed by a selected element from the set of element relative to the selected UI configuration. The embodiment matches the function performed by the selected element with a function identified in a hierarchy of elements, the hierarchy being applicable to a plurality of mobile apps. The embodiment assigns a category of the function identified in the hierarchy to the selected element. The embodiment determines, using the hierarchy, a type of development skill used in developing the selected element. The embodiment outputs in a blueprint of the mobile app, the category, the type of the development skill, and a numerosity of occurrences of the selected element in the mobile app.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
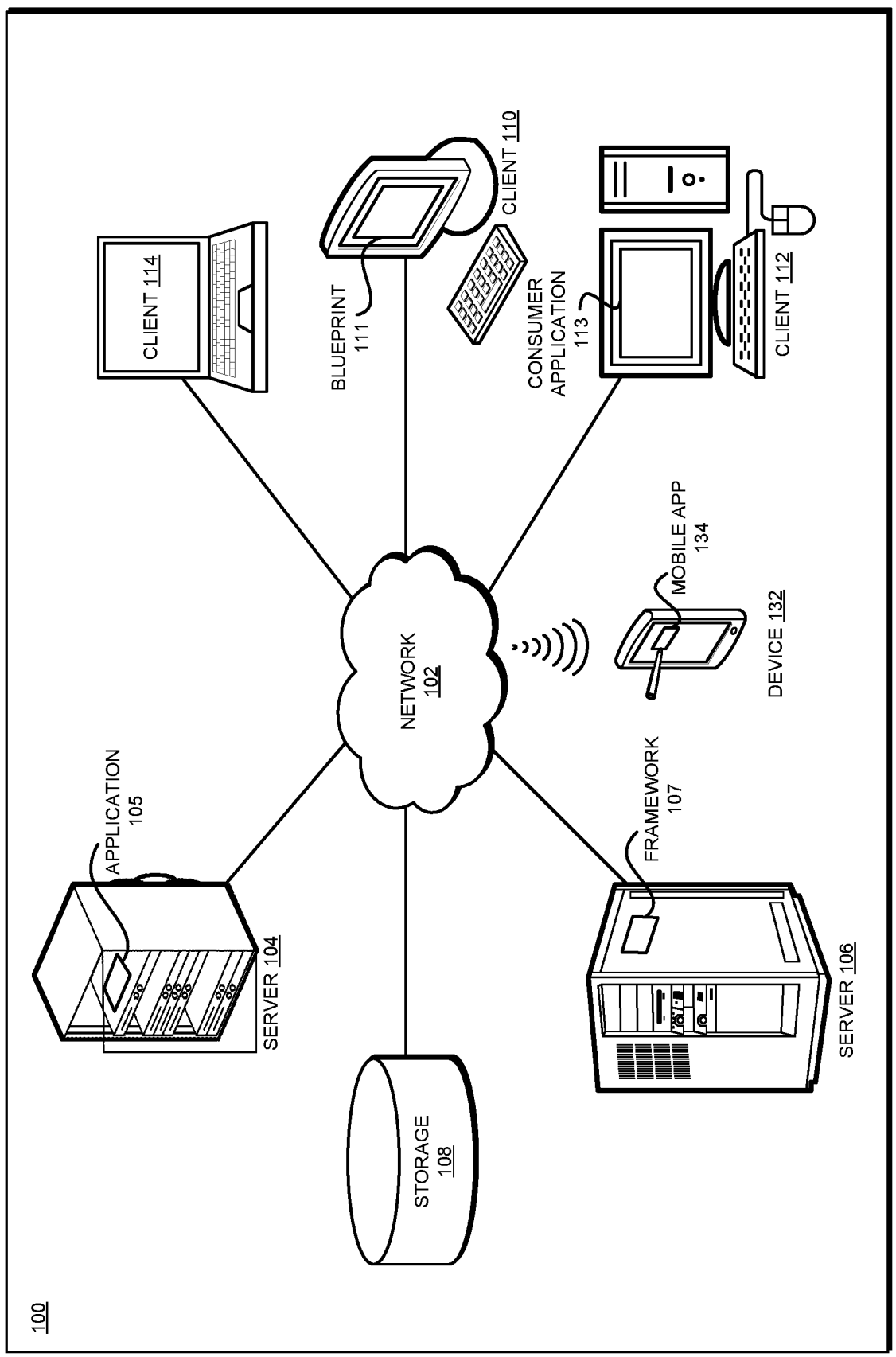
FIG. 1 depicts a block diagram of a network of data processing systems in which illustrative embodiments may be implemented.

The illustrative embodiments recognize that being able to develop a mobile app is dependent—in a large part—upon a detailed estimation of the types and amounts of the various skills needed to implement the several aspects of the app. If the required development skills for developing or implementing an app are not well estimated, it is unlikely that the app will be implemented within the timeframe or the budget with a desired level of success.

Similarly, the illustrative embodiments recognize that being able to appropriately use or exercise a mobile app, such as by an end user or a tester, is dependent—in a large part—upon a detailed estimation of the types and amounts of the various skills needed to use or test the several aspects of the app. If the required skills for using or testing an app are not well estimated, it is unlikely that the app will be used or tested adequately with a desired level of success.

For example, some mobile apps, which are referred to as Business to Employee or "B2E" apps, are becoming increasingly prevalent within business enterprises. These mobile apps are replacing the traditional web based or custom applications that employees have typically used to perform their tasks in the past. Whether the development of a B2E app is desirable, advantageous, or even successful, is highly dependent on the accuracy of the estimate of the skills needed to develop the capabilities and functionality of the app.

The illustrative embodiments recognize that manually examining a specification of an app is not a guaranteed way of discovering the various features and functions that have to be implemented in the app. It is a very familiar situation that a seasoned developer of an app discovers a feature of the app after a prolonged development effort, and find that the type or level of skills needed to develop that feature are not available in the development team at all, or are not available when needed, or are not available in the amount needed.

The illustrative embodiments recognize that given the task of developing a new mobile app, there presently exists no automated way for a user/developer to analyze the mobile app and create a blueprint of the app that reliably reveals all the properties of the UI, the functions of the app, and the level, type, and amount of skill needed to develop those properties and functions.

The illustrative embodiments used to describe the invention generally address and solve the above-described problems and other problems related to automatically determining the skills needed to develop the features and functions of a mobile app.

While the illustrative embodiments are described with respect to skills needed for the development of mobile apps, those of ordinary skill in art will be able to adapt an embodiment to assess the skills needed to use or test a mobile app, and such adaptations are contemplated within the scope of the illustrative embodiments. For example, certain mobile apps may justify establishing a minimum set of skills, a minimum level of expertise in a skill, or a combination thereof, to be able to use, test, or otherwise exercise the features and functions of a mobile app to a desired degree. Under such circumstances, an embodiment described herein can be used to establish such a minimum skill set or minimum skill level for the user or the tester instead of establishing such a minimum skill set or minimum skill level for the developer of the app.

An embodiment can be implemented as a software application. The application implementing an embodiment can be configured as a modification of an existing software development system, as a separate application that operates in conjunction with an existing software development system, a standalone application, or some combination thereof.

A UI or a function of a mobile app comprises a set of elements. An element of a UI (UI element) is an artifact that is visibly presented or presentable on a screen used in the UI. A screen is a graphical layout that is presented or presentable on the UI of the app. an element of a function (function element) of the app is a functional component—e.g., an implementation of a method or generally a portion of computer usable code—which operates to perform an operation configured in the app. A function element can manifest itself as an invisible UI element.

A framework of elements (framework) is any suitable type of a hierarchy of elements, that are available for use in a mobile app on a given operating system (platform). Different sets of elements, different hierarchies of a common set of elements, or some combination thereof, may be available for use on different platforms. Consequently, different frameworks may be applicable to different platforms. From a framework, a mobile app can implement some or all elements in the form of the UI elements of the app, function elements of the app, or both.

A hierarchy of elements is an arrangement of a set of elements according to some dependency, characteristic, or other relationship between the elements. For example, an element may exist under a root node of a hierarchy in an example framework. The element may provide a configuration function where the configuration is applicable to the app as a whole.

An element may act as a parent or a root node for zero or more sub-elements. For example, the app configuration function element may have a sub-element that configures only the UI of the app, and another sub-element that configures only the communications function of the app.

A sub-element may act as a parent or a root node for zero or more detailed elements. For example, the UI configuration sub-element may have one detailed element that configures only the branding visuals on the UI, and another detailed element that configures only the localization or internationalization aspects on the UI.

Generally, any number of the highest level elements, any number of sub-elements below an element, any number of sub-sub-elements below a sub-element, and so on, and any number of levels in a hierarchy in a similar manner are possible and contemplated in a framework. Hereinafter, a reference to an element is contemplated to be representative of a reference to a highest level element, a sub-element, a detailed element, or a sub-sub-element at any level in a given hierarchy, unless expressly distinguished where used. A mobile app may use all or a subset of elements from any combination of the levels represented in a given framework.

Furthermore, a framework of elements also includes skills data for those elements. More particularly, an element represented as a node at any level in a framework according to an embodiment also includes skill data related to that element at that level in the framework. The skill data of an element includes an identifier or another suitable description of a type of skill—e.g., experience with a particular developer toolkit—that is useful for developing that element, a level of expertise—e.g., development and testing experience with the example toolkit—in that skill, an amount of the skill—e.g., a number of years or number of projects completed using the example toolkit, or some combination thereof, that is desirable to successfully implement the element.

In one example embodiment, the skills are defined at the detailed element level. For example, there may be detailed elements within the same sub-element that may require special or different skills. While most of the skills for a given sub-element may be the same across the various detailed elements of the sub-element, defining the skills at the lowest level of the framework, e.g., at the detailed element level in the framework in this example embodiment, allows for fine tuning the framework for specialized skills requirements and efficiently accommodates future changes in the skills requirements.

A blueprint of an app is a report about the app in which the elements that are used in the app, the category of a used element, the screen or screens relative to which an element is used in the app, a numerosity of the occurrences of an element in a single screen, a numerosity of the occurrences of an element in a plurality of screens of the app, or some combination of these and other data are reported. Adding the skills data of the various elements in the blueprint forms a blueprint with skills data.

A category of an element is a type, category, or classification associated with the element in a framework. Within the scope of the illustrative embodiments, an embodiment can be adapted to construct a blueprint of a mobile app that has been prototyped or partially developed, or of a mobile app that has only been specified in a specification but does not yet exist, has not yet been prototyped, or is not yet fully operational.

An embodiment receives a prototyped or partially completed mobile app, or a specification of a mobile app. for example, the embodiment may be supplied a reference to such an app, or a reference to a document that forms the specification for the mobile app.

The app or the specification or a reference to either the app or the specification, which form an input to an embodiment, are collectively and interchangeably referred to herein as an input app. Depending upon the platform for which the input app is to be configured, the embodiment loads a suitable platform-specific framework. The framework includes skills data as described herein. When the input app is provided for multiple platforms, the embodiment selects one platform and loads the framework with skills data for the selected platform at a time.

The embodiment analyzes the input app to identify a set of screens to which navigation within the input app is possible. For each selected screen in the set, the embodiment detects or otherwise determines a set of elements. Recall that the set of elements related to the screen can include any combination of UI elements and function elements, where such elements can be represented anywhere in the selected framework.

The embodiment categorizes each element from the set of elements according to the one or more categories assigned to the element or a similar element in the selected framework. For example, the input app may use a modified form of an element that performs more than one functions, which therefore maps the used element to more than one elements in the selected framework, and can therefore be categorized into more than one categories according to the categories of those elements the framework.

The embodiment categorizes each element in each screen of the input app. while categorizing, the embodiment also tracks the number of times an element has been used relative to a particular screen, the number of times the element has been used relative to any screen in the input app, or some combination thereof. The embodiment uses this tracking to construct a utilization summary for each element, each screen, and each platform applicable to the input app.

Additionally, for each element, the embodiment estimates a type, level, and/or amount of skill that should be planned to develop that element. For example, when an element is mapped to multiple categories in the framework, a combination of the skills from those multiple categories may be needed for the development of the element.

Furthermore, depending upon the utilization summary, an element may be more closely related to one category than another, when the element is mapped to multiple categories. Accordingly, in one embodiment, the skills, or a type, level, or amount thereof corresponding to one category may be weighted more than the skills, or a type, level, or amount thereof corresponding to the other category. In another embodiment, the skills, or a type, level, or amount thereof corresponding to one category may be prioritized higher than the skills, or a type, level, or amount thereof corresponding to the other category. In another embodiment, the skills, or a type, level, or amount thereof corresponding to one category may be desired in a higher quantity or quality than the skills, or a type, level, or amount thereof corresponding to the other category.

The embodiment constructs a blueprint with skills data of the input app by detailing, in a report of any suitable form, the detected elements of the input app, the categories of the detected elements, the interdependencies or relationships of a detected element with other elements in the input app, the utilization summaries corresponding to the detected elements, the skills data of the various elements computed in the manner described herein, or some combination thereof, as may be suitable in a given implementation. The blueprint with skills data is usable by a user for developing the features and functions of the input app, or is consumable by a consumer app for further processing relative to the input app.

A problem recognized by the illustrative embodiments is that such a blueprint with skills data cannot be reliably constructed manually at least because many navigations pathways and elements cannot be identified manually in a prototyped or partially developed mobile app. The illustrative embodiments also recognize that such a blueprint cannot be reliably created from the specification of the app for similar reasons.

A method of an embodiment described herein, when implemented to execute on a device or data processing system, comprises substantial advancement of the functionality of that device or data processing system in revealing the features and functions of a mobile app, and the skills needed to develop them, on demand. For example, presently available methods for developing a mobile app rely on assessing a non-element-specific skill set that might be needed to develop a mobile app at the beginning of a development project. Such methods often find that a particular skill needed for a particular element of the mobile app is lacking in the development environment when the particular element is encountered, which is often too late in the development process. An embodiment automatically and on demand analyzes a specification, a prototype, or a partially completed implementation of a mobile app—i.e., the input app—and produces a comprehensive blueprint of the mobile app. The blueprint contains the skills data corresponding to each element identified in the blueprint. The blueprint can be re-constructed as and when the input app is changed or updated. This manner of creating an on-demand skills blueprint of a mobile application is unavailable in the presently available methods. Thus, a substantial advancement of such devices or data processing systems by executing a method of an embodiment is in sufficiently and automatically revealing the functions and features of unknown mobile apps on demand, with concurrent evaluation of the type, level, and amount of skills needed to implement those functions and features.

The illustrative embodiments are described with respect to certain types of apps, UI, functions, elements, categories, hierarchies, platforms, utilizations, summaries, skills, types of skills, levels of skills, amounts of skills, skills data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
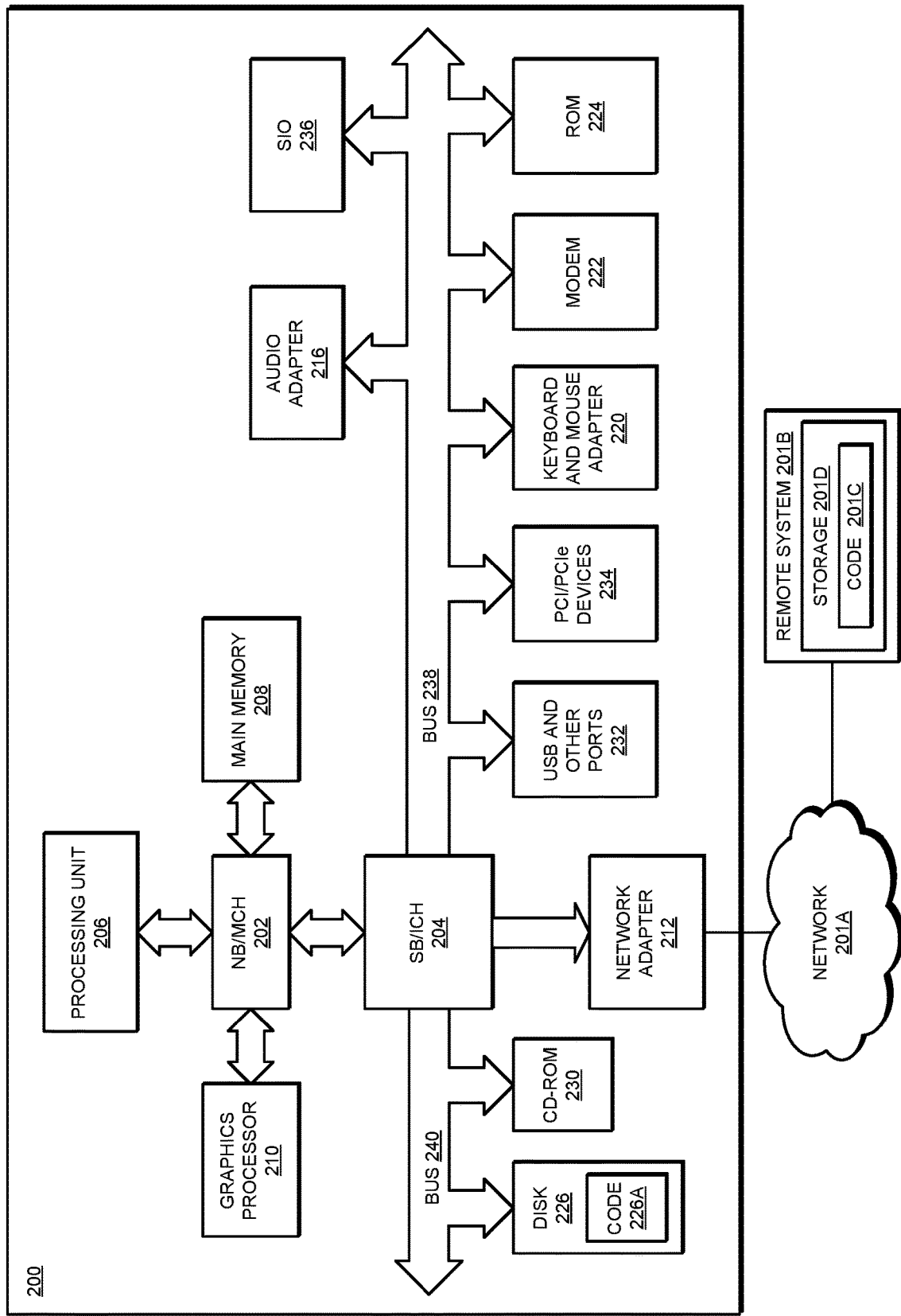
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 uses framework 107 to produce blueprint 111 of mobile app 134 as described herein. Framework 107 includes skills data according to an embodiment described herein. Blueprint 111 includes skills data corresponding to the elements described therein. Consumer application 113 consumes or uses blueprint 111 in any manner suitable according to an implementation.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system. An object oriented programming system may run in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
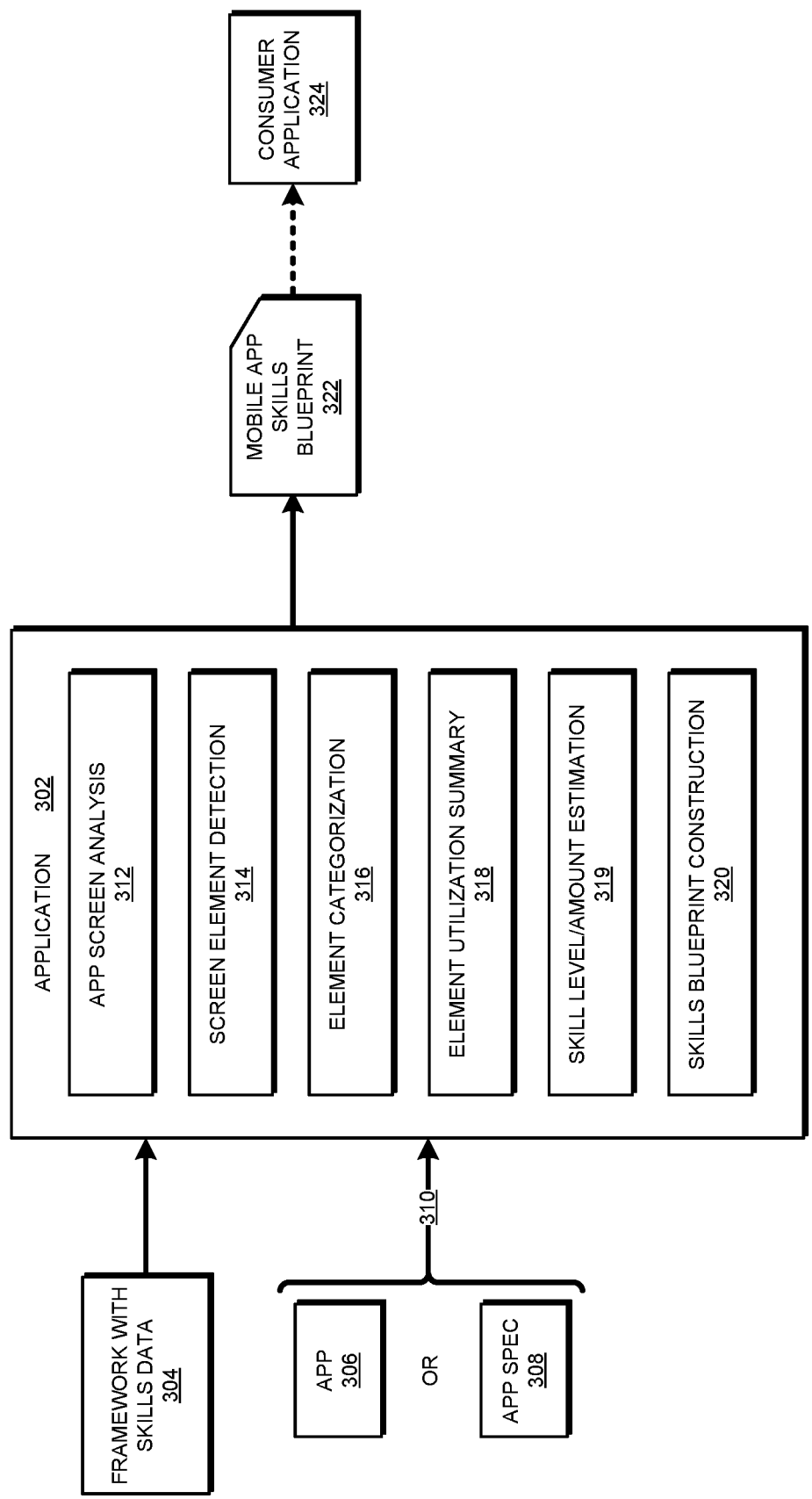
FIG. 3 depicts a block diagram of an example configuration for creating an on-demand skills blueprint of a mobile application in accordance with an illustrative embodiment.

With reference to FIG. 3, this figure depicts a block diagram of an example configuration for creating an on-demand skills blueprint of a mobile application in accordance with an illustrative embodiment. Application 302 is an example of application 105 in FIG. 1.

Framework 304, which is an example of framework 107 in FIG. 1, includes skills data as described herein, forms an input to application 302. Prototyped or partially developed mobile app 306 or specification 308 of a mobile app forms input app 310 as described herein, and is another input to application 302.

Component 312 analyzes input app 310 to identify a set of screens that are navigationally possible in input app 310. Component 314 detects or otherwise determines an element used in a screen, e.g., a UI element, or in conjunction with a screen, e.g., a function element. Component 314 detects a set of elements used in input app 310 in this manner.

Component 316 categorizes a detected element according to framework 304. Component 318 computes a utilization summary of the element as described herein. Thus, components 316 and 318 process each element from the set of elements detected in input app 310 by component 314.

Component 319 uses the skills data in framework 304 to determine the skills corresponding to the one or more categories associated with a detected element. For example, component 319 determines a type and level of each skill associated with each category of the detected element. Furthermore, depending upon the utilization summary of the element, component 319 further computes or estimates an amount of a determined skill that can be expected to be needed in developing that element during the development of mobile app 306.

Component 320 constructs mobile app skills blueprint 322 of input app 310. Blueprint 322 includes the skills data computed by component 319. Consumer application 324 consumes or uses mobile app skills blueprint 322.

Figure 4:
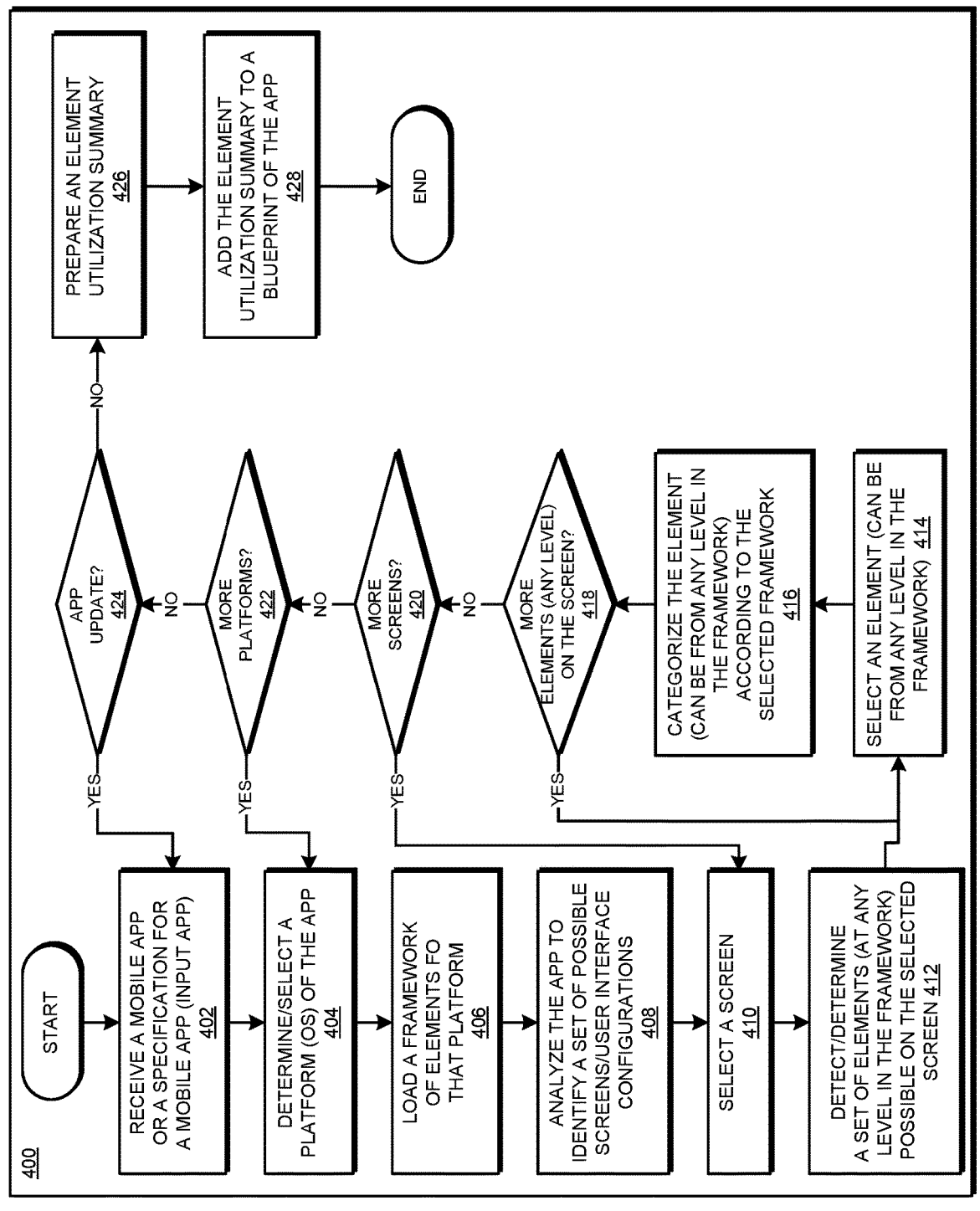
FIG. 4 depicts a flowchart of an example process for creating an on-demand skills blueprint of a mobile application in accordance with an illustrative embodiment.

With reference to FIG. 4, this figure depicts a flowchart of an example process for creating an on-demand skills blueprint of a mobile application in accordance with an illustrative embodiment. Process 400 can be implemented in application 302 in FIG. 3.

The application receives a mobile app or a specification for a mobile app, i.e., the input app as described herein (block 402). The application determines or selects an operating system, i.e., a platform, for which the input app has to be blueprinted (block 404).

The application loads a framework corresponding to the selected platform (block 406). The application analyzes the app to identify a set of possible screens or UI configurations that are reachable during a possible use of, or a manner of operating, the input app (block 408). The application selects a screen (block 410).

The application detects or otherwise determines a set of elements that are used or can be possibly used on or relative to the selected screen during a use of, or a manner of operating, the input app (block 412). Recall that an element in the set of elements can be a highest level element, a sub-element, a detailed element, or generally an element appearing at any level in the given hierarchy.

The application selects an element from the set of elements (block 414). The selected element can be from any level of the loaded framework.

The application determines a category that is applicable to the element, which can be from any level of the loaded framework, based on a manner in which the element is used in the input app. Particularly, the application matches the element to a node element in the selected framework according to one or more of the element's functionality, manner of use relative to the screen, and/or a purpose for which the element is used relative to the screen, and the matching identifies one or more categories that are applicable to the selected element (block 416).

The application determines whether more elements remain in the set of elements corresponding to the selected screen (block 418). If, for the selected screen, more elements from any level of the framework remain to be categorized ("Yes" path of block 418), the application returns to block 414 and selects another element.

Figure 5:
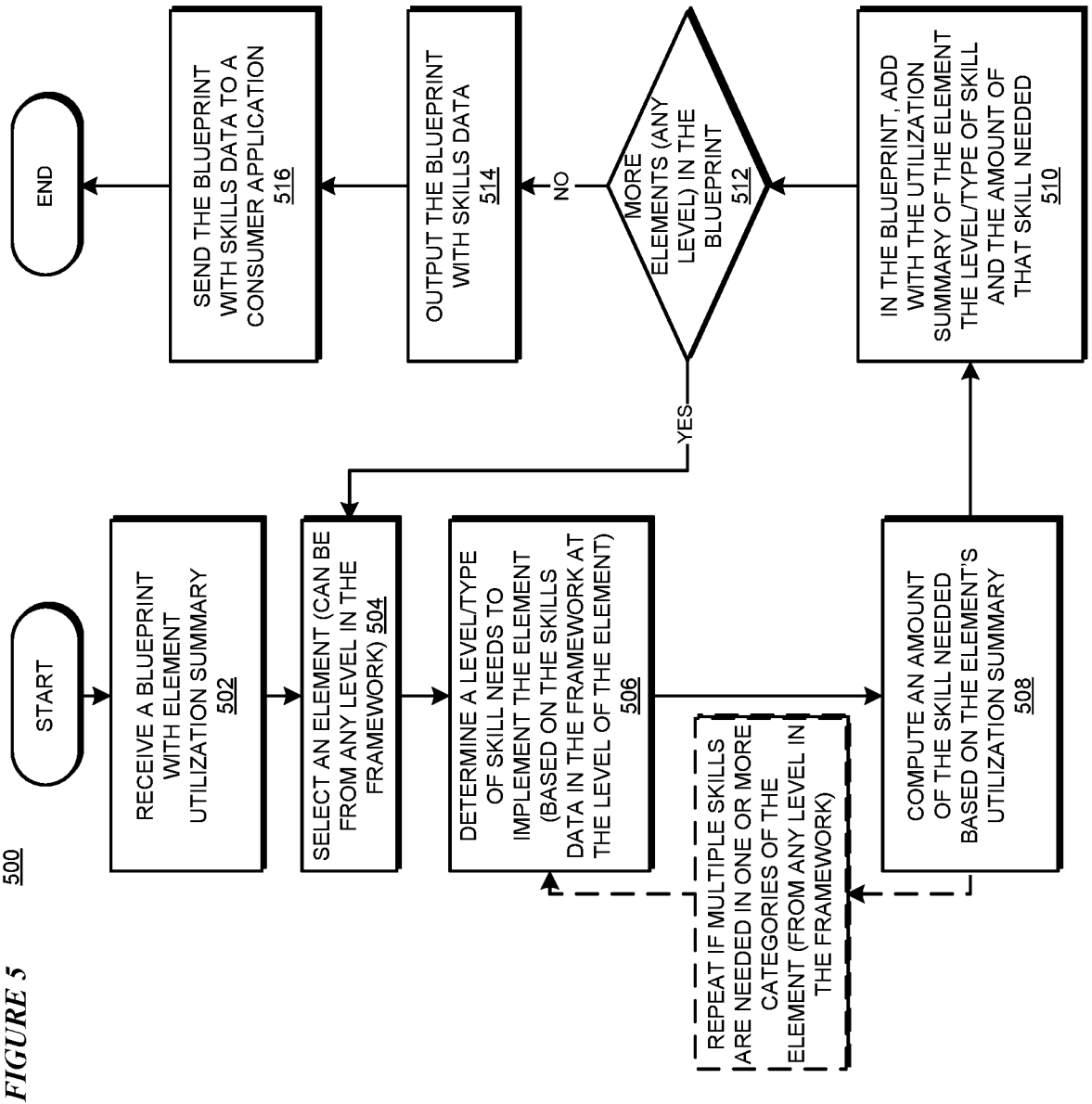
FIG. 5 depicts a flowchart of an example process for producing a blueprint with skills data in accordance with an illustrative embodiment.

In one embodiment, the skills determination relative to the selected element, as described with respect to process 500 in FIG. 5, can be implemented in a modified process 400. For example, the skills determination blocks 506, 508, and 510 of process 500 can be combined with process 400 of FIG. 4, and the output blueprint with skills data can be produced from such a modified process 400 within the scope of the illustrative embodiments.

If no more elements of the selected screen remain to be categorized ("No" path of block 418), the application determines whether more screens remain in the set of screens for analysis (block 420). If more screens remain for analysis ("Yes" path of block 420), the application returns to block 414 and selects another screen.

If no more screens remain for analysis ("No" path of block 420), the application determines whether more platforms are applicable to the input app (block 422). If more platforms are applicable to the input app ("Yes" block 422), the application returns to block 404 and selects another platform.

If the input app need not be analyzed for more platforms ("No" path of block 422), the application determines whether the input app has been updated (block 424). If the input app has been updated ("Yes" path of block 424), the application returns to block 402 and receives the updated input app into process 400.

If the input app has not been updated ("No" path of block 424), the application prepares an element utilization summary for each element used in the input app (block 426). The application adds the element information as described herein and the element utilization summary of block 426 in a blueprint for the input app (block 428). The application ends process 400 thereafter.

With reference to FIG. 5, this figure depicts a flowchart of an example process for producing a blueprint with skills data in accordance with an illustrative embodiment. Process 500 can be implemented in application 302 in FIG. 3.

The application receives the blueprint produced at block 428 in process 400 of FIG. 4 (block 502). The application selects an element in the blueprint (block 504). The selected element can be from any level of the framework. The application determines a type of a skill, a level of the skill, or both, that is indicated in the framework as needed for implementing the selected element (block 506). The skills data is determined from the level of selected element in the framework.

The application uses the utilization summary of the element to compute an amount of the skill needed for the implementation (block 508). The application may repeat blocks 506 and 508 if multiple skills are needed in one or more categories of the element, which can be from any level in the framework. The application adds to the blueprint, the skills data of the element (block 510).

The application determines whether the skills data of more elements has to be computed (block 512). If the skills data of more elements has to be computed ("Yes" path of block 512), the application returns process 500 to block 504 to select another element. If the skills data of all desired elements has been computed ("No" block 512), the application outputs the blueprint with the skills data (block 514). The application sends the blueprint with the skills data to a consumer application (block 516). The application ends process 500 thereafter.

Thus, a computer implemented method, system or apparatus, and computer program product are provided in the illustrative embodiments for creating an on-demand skills blueprint of a mobile application and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    performing an analysis, using a processor and a memory, of a mobile app, the analysis determining each user interface (UI) configuration in a set of UI configurations that is reachable in a use of the mobile app;
    detecting a set of elements used in the mobile app relative to a selected UI configuration from the set of UI configurations;
    analyzing, using the processor and the memory, a function performed by a selected element from the set of elements relative to the selected UI configuration;
    matching the function performed by the selected element with a function identified in a hierarchy of elements, the hierarchy being applicable to a plurality of mobile apps;
    assigning a category of the function identified in the hierarchy to the selected element;
    determining, using the hierarchy, a type of development skill used in developing the selected element; and
    outputting in a blueprint of the mobile app the category and the type of the development skill.

2. The method of claim 1, further comprising:
    computing, using a numerosity of occurrences of the selected element, an amount of the development skill that will be used in developing the selected element.

3. The method of claim 1, further comprising:
    determining from the hierarchy, a level of expertise in the development skill.

4. The method of claim 2, further comprising:
    computing a number of times the selected element can be used in the selected UI configuration via a plurality of paths in the mobile apps, the number of times forming the numerosity of occurrences.

5. The method of claim 2, further comprising:
    computing a number of times the selected element can be used in any UI configuration in the set of UI configurations via a plurality of paths in the mobile apps, the number of times forming the numerosity of occurrences.

6. The method of claim 1, wherein the blueprint is constructed automatically on-demand.

7. The method of claim 1, wherein the hierarchy is specific to an operating system on which the mobile app is configured to operate, further comprising:
    modifying the hierarchy to include, for each element represented in the hierarchy, a type of a specific development skill, a level of the specific development skill, and an amount of the specific development skill that is usable in implementing an instance of the element.

8. The method of claim 1, wherein the function performed by the selected element comprises a manner in which the selected element is used in the selected UI configuration.

9. The method of claim 1, wherein the function performed by the selected element comprises an operation that is to be implemented in the selected element for use in the selected UI configuration.

10. The method of claim 1, further comprising:
    determining a name used for the selected element relative to the selected UI configuration, wherein the function performed by the selected element is discoverable from the name.

11. The method of claim 1, wherein a first element in the set of elements is rendered visibly on the selected UI configuration, wherein the first element provides visual information and receives an input relative to the selected UI configuration.

12. The method of claim 1, wherein a first element in the set of elements is invisible on the selected UI configuration, wherein the first element has to implement a function relative on the selected UI configuration in the mobile app.

13. The method of claim 1, further comprising:
    receiving data of the mobile app, wherein the data of the mobile app comprises a reference to a specification of the mobile app.

14. The method of claim 1, further comprising:
    receiving data of the mobile app, wherein the data of the mobile app comprises a reference to a partial implementation of the mobile app.

15. The method of claim 1, wherein the UI configuration comprises a graphical layout presentable as a screen on a UI.

16. The method of claim 1, wherein the use comprises navigating through a set of features of the mobile app.

17. A computer usable program product comprising one or more computer-readable storage medium, and program instructions stored on at least one of the one or more storage medium, the stored program instructions comprising:
    program instructions to perform an analysis, using a processor and a memory, of a mobile app, the analysis determining each user interface (UI) configuration in a set of UI configurations that is reachable in a use of the mobile app;
    program instructions to detect a set of elements used in the mobile app relative to a selected UI configuration from the set of UI configurations;
    program instructions to analyze, using the processor and the memory, a function performed by a selected element from the set of elements relative to the selected UI configuration;
    program instructions to match the function performed by the selected element with a function identified in a hierarchy of elements, the hierarchy being applicable to a plurality of mobile apps;
    program instructions to assign a category of the function identified in the hierarchy to the selected element;
    program instructions to determine, using the hierarchy, a type of development skill used in developing the selected element; and program instructions to output in a blueprint of the mobile app the category and the type of the development skill.

18. The computer usable program product of claim 17, wherein the computer usable code is stored in a computer readable storage device in a data processing system, and wherein the computer usable code is transferred over a network from a remote data processing system.

19. The computer usable program product of claim 17, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage medium, and program instructions stored on at least one of the one or more storage medium for execution by at least one of the one or more processors via at least one of the one or more memories, the stored program instructions comprising:

program instructions to perform an analysis, using a processor and a memory, of a mobile app, the analysis determining each user interface (UI) configuration in a set of UI configurations that is reachable in a use of the mobile app;

program instructions to detect a set of elements used in the mobile app relative to a selected UI configuration from the set of UI configurations;

program instructions to analyze, using the processor and the memory, a function performed by a selected element from the set of elements relative to the selected UI configuration;

program instructions to match the function performed by the selected element with a function identified in a hierarchy of elements, the hierarchy being applicable to a plurality of mobile apps;

program instructions to assign a category of the function identified in the hierarchy to the selected element;

program instructions to determine, using the hierarchy, a type of development skill used in developing the selected element; and program instructions to output in a blueprint of the mobile app the category and the type of the development skill.

* * * * *